Figure 1:
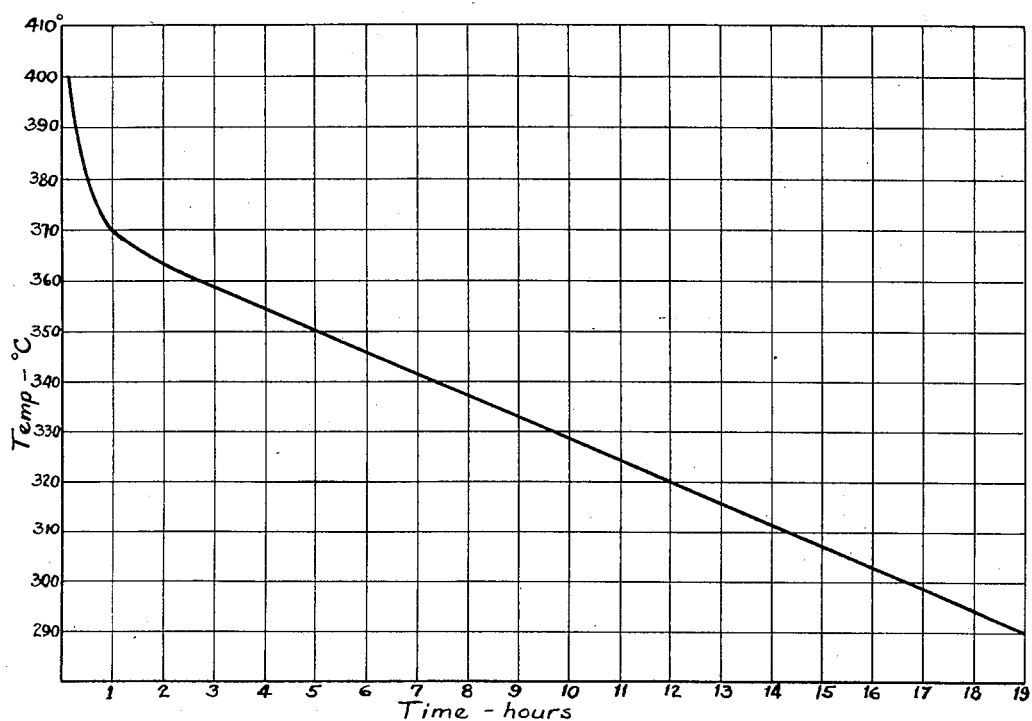

Sept. 19, 1933.    S. B. HEATH ET AL    1,927,660
TREATING MATERIALS WITH HYDROCHLORIC ACID GAS AT ELEVATED TEMPERATURES
Filed Dec. 10, 1930

Patented Sept. 19, 1933

1,927,660

UNITED STATES PATENT OFFICE 1,927,660

TREATING MATERIALS WITH HYDROCHLORIC ACID GAS AT ELEVATED TEMPERATURES

Sheldon B. Heath and Ormond E. Barstow, Midland, Mich., assignors to The Dow Chemical Company, Midland, Mich., a corporation of Michigan Application December 10, 1930
Serial No. 501,196

5 Claims. (Cl. 23—91)

The invention relates to improvements in methods for treating materials with hydrochloric acid gas at elevated temperatures, particularly to methods for dehydrating magnesium chloride in an atmosphere of hydrochloric acid gas to prepare the anhydrous salt.

The familiar method for dehydrating magnesium chloride to the anhydrous form, as set forth for instance in U. S. Patent 1,479,982, consists in partially drying the normal hydrated salt, $MgCl_2.6H_2O$, by heating in air to reduce the water content to a point represented approximately by the formula $MgCl_2.2H_2O$, and then completing the dehydration by heating such intermediate product further in an atmosphere of hydrochloric acid gas. It has been found more recently that the initial air-drying stage under suitable control may profitably be carried to the point where, instead of the dihydrate, the monohydrate, $MgCl_2.H_2O$, is the principal constituent of the intermediate product. Such degree of dehydration in air may be attained without a detrimental amount of decomposition, as shown in a patent application of A. K. Smith and W. R. Veazey, Serial No. 372,796, filed June 21, 1929, Patent No. 1,874,373.

The present invention has more particularly to do with improved procedure for carrying out the second stage of the dehydration, wherein a partially dehydrated form of magnesium chloride is heated in an atmosphere of hydrochloric acid. The temperatures applicable for the latter operation are comprised generally within the range of about 300° to 650° C., i. e. from a temperature at which a practical drying rate is attained up to one approaching closely to the fusion point of the material. For a commercial process, however, practical considerations largely compel the use of iron or steel apparatus, which imposes a limitation upon the temperatures that may actually be employed in the second stage, due to the corrosive action of hydrochloric acid upon iron at sufficiently elevated temperatures.

Under usual conditions hydrochloric acid gas may be handled in iron apparatus without serious corrosion thereof in a temperature range between about 140° and 325° C., as disclosed in detail in a patent application of O. E. Barstow and S. B. Heath for a "Method of distilling hydrogen halides", Serial No. 378,019, filed July 13, 1929, Patent No. 1,853,330, even when the acid gas contains some water vapor such as naturally results from the removal of water from a salt being dried. In the dehydration of magnesium chloride, therefore, the practice has been to conduct the final drying stage in an atmosphere of hydrochloric acid gas at a temperature as close to 325° C. as feasible, in order to attain the highest possible drying rate while avoiding material corrosion of apparatus and contamination of the dried product with iron compounds produced by such corrosion. However, it is extremely desirable to carry out the operation at a higher temperature in order to secure the advantage of a more rapid drying rate. We have now discovered that the temperature range may be extended to as high a temperature as 450° C. or thereabouts, without substantially greater corrosion of iron apparatus by the hydrochloric acid than at 325° C., if such acid gas is deoxygenated prior to its introduction into the drying apparatus. The invention, then, consists in the improved procedure hereinafter fully described and particularly pointed out in the claims, the accompanying drawing and following description setting forth but a few of the ways in which the principle of the invention may be used.

In the drawing, the single figure is a chart showing the relative drying rates of a material consisting chiefly of $MgCl_2.H_2O$ at different temperatures.

Referring to the drawing, the values for the curve there reproduced were determined by dehydrating at various temperatures in an atmosphere of hydrochloric acid gas an air-dried magnesium chloride in flake or granular form, consisting of a mixture of the monohydrated chloride and basic chloride, to make a product containing 97.5 per cent $MgCl_2$. When heated in an atmosphere of hydrochloric acid the water content of the monohydrate component was driven off and the basic chloride component was at the same time converted largely to anhydrous magnesium chloride by reaction with the acid. As seen from the curve, the time required for making substantially anhydrous $MgCl_2$ product varies enormously over a temperature range from 300° to 400° C., e. g. being about 16.5 hours at 300° C., or 11 hours at 325° C. and only 5 minutes at 400° C. in the particular apparatus employed for the tests. Manifestly, a commercial drying process is most advantageously to be carried out at a temperature in the neighborhood of 400° C. or higher. On the other hand, to do so has not been practical in the past with iron apparatus owing to the corrosion thereof, under the conditions existing, by hydrochloric acid at temperatures above about 325° C., so that commercial drying processes have been limited to the comparatively slow rate of drying at the latter temperature.

We have found that the dry hydrochloric acid gas prepared by the usual methods, which has been employed heretofore for the dehydration of magnesium chloride, contains varying amounts of air or oxygen, in average practice as much as 25 per cent air or 5 per cent oxygen. In the presence of such oxygen the acid gas apparently acts upon the iron to produce ferric chloride, either directly or by rapid oxidation of an intermediately formed ferrous chloride. At temperatures below 300° C. ferric chloride does not volatilize appreciably, so that a thin skin thereof formed initially on the iron surface seems to be relatively permanent and protects it from further attack. Above 300° C., however, the volatility of ferric chloride increases rapidly, so that the initially formed coating thereof on the apparatus is constantly driven off, leaving the metallic surface exposed, and the corrosion becomes more or less continuous. Such corrosion becomes severe enough at temperatures above 325° C. to cause material contamination of the magnesium chloride product with iron compounds, and the life of the apparatus may be materially affected. The rate of corrosion does not change greatly with varying air content of the hydrochloric acid gas, having been found to be about the same with 5 per cent of air present as with 20 per cent thereof. As a matter of fact, the presence of even very small amounts of air in hydrochloric acid gas may be detected at temperatures above about 325° C. by exposing an iron surface thereto and noting the deposit of ferric chloride condensed in a cooler part of a suitable test apparatus.

Now, when no oxygen is present in the hydrochloric acid gas in contact with an iron surface, ferrous chloride alone is formed as a superficial coating which is not appreciably volatile at temperatures as high as 400° to 450° C., the coating formed serving to protect the metal from further attack at such temperatures. We have determined the actual corrosion of an iron surface exposed both to hydrochloric acid gas containing air and to deoxygenated hydrochloric acid gas at temperatures from 300° to 650° C. The results of some tests are given in the following table in which the corrosion is expressed as pounds of iron removed from the surface per square foot per year:—

| Temperature 0° C. | Corrosion | |
| --- | --- | --- |
|  | HCl+5% air | Deox. HCl |
| 300 | 0.7 |  |
| 315 | 1.1 |  |
| 325 | 1.3 |  |
| 450 | 4.8 | 1.2 |
| 550 |  | 3.4 |
| 650 |  | 49.2 |

It is seen that the corrosion with deoxygenated hydrochloric acid gas at 450° C. is no greater than that with hydrochloric acid gas containing 5 per cent air at 315° to 325° C., and even at 550° C. does not rise to an excessive figure, but at 650° C. it becomes quite rapid.

The results have shown that it is practicable to treat partially dried magnesium chloride with hydrochloric acid gas at temperatures as high as 400° C. or 450° C. without serious corrosion of iron apparatus or contamination of the produce, if such acid gas is first deoxygenated. In other words, the process may then be carried out at temperatures permitting a high drying or reaction rate instead of at the lower temperatures heretofore employed which suffered from the disadvantage of a relatively slow rate. By operating it in this way a very much smaller apparatus may be employed to yield the same output of anhydrous salt, thereby materially lowering the capital charges on the plant as well as giving other evident advantages.

The deoxygenation of the hydrochloric acid gas may be effected in any desired manner. A convenient method, which we prefer to use, consists in passing the acid gas through a body of granular carbon material maintained at a red heat, or at least in a glowing condition. Various forms of carbon may be used, such as charcoal, coke or hard electrode carbon, broken up into small pieces. For heating the granular carbon material we prefer to employ an electric current which is passed through the mass and heats the same by means of its electrical resistance. We have found that it is possible to deoxygenate the acid gas completely in this way by a simple operation. When the acid gas containing air also contains traces of chlorine, which may be the case when the supply thereof is derived from organic chlorination processes, such free chlorine is converted simultaneously by the same treatment either to phosgene or, if water vapor is present, to hydrochloric acid.

In carrying out our improved process, therefore, we prepare a substantially dry hydrochloric acid gas according to any of the known methods, deoxygenate and purify the same by passing through a body of glowing carbon, preferably electrically heated, and then contact the hot deoxygenated acid gas in a suitable iron apparatus with any desired form of partially dehydrated magnesium chloride at a temperature above 325° C., preferably between about 400° and 450° C., to convert the chloride to the anhydrous form. Higher temperatures, e. g. up to about 550° C., may be employed, whereat the apparatus will not suffer much greater attack per pound of product made than at 450° C., because in the range 450° to 550° C. the increasing rate of heat input results in a greater drying rate parallel with a somewhat higher corrosion rate, the one tending to offset the other to maintain about the same amount of corosion per pound of product at 550° C. as at 450° C. Consequently, there is a comparatively wide temperature range, e. g. 325° to 550° C., within which the dehydration may be carried out using deoxygenated hydrochloric acid gas without serious corrosion but at a relatively rapid drying rate, whereas, when the acid gas contains oxygen, the temperature must be held very closely to 325° C. to avoid corrosion which becomes a factor above that temperature while below it the drying rate is excessively slow.

As a material to be treated according to the process of our invention we may use any suitable partially dehydrated form of magnesium chloride, such as the material corresponding approximately to the dihydrate, $MgCl_2.2H_2O$, or the monohydrate, $MgCl_2.H_2O$, or mixtures thereof, with or without a component of basic chloride or oxide resulting from the preliminary air-drying of the normal hexahydrated salt, or we may use the oxide, hydroxide, carbonate, or basic chloride of magnesium which may be converted to the anhydrous chloride by direct reaction with hydrochloric acid at the temperatures employed. The exact composition of such material is not controlling as regards the principle of the invention, but the material should be in a more or less finely divided condition, e. g. in flake, granular or powdered form. The essential feature consists in preparing a substantially anhydrous magnesium chloride by treatment of a suitable magnesium compound in an atmosphere or current of substantially oxygen-free hydrochloric acid gas, the operation being most advantageously conducted at a temperature between about 325° C. and 550° C., although lower temperatures may be used, if so desired. Naturally, at temperatures below 325° C. corrosion of exposed iron surfaces will be practically negligible, provided that the temperature does not fall to the point where moisture commences to condense out, enabling the chemical reaction to be carried out in iron apparatus with gaseous hydrochloric acid within such lower temperature range above about 140° C. without material contamination of the product with iron compounds.

In its broad aspects the invention, therefore, comprehends the treatment of any solid material, preferably in comminuted condition, with deoxygenated hydrochloric acid gas, whereby the operation may be carried out in contact with exposed surfaces of metallic iron in a temperature range between about 140° and 550° C. with a minimum of corrosion of such surfaces. For example, a metallic oxide, e. g. iron oxide itself, may be treated in an iron apparatus with deoxygenated hydrochloric acid gas within the temperature range hereinbefore specified to form iron chloride without materially attacking the apparatus itself. Furthermore, the invention includes the improved method of handling hydrochloric acid gas at elevated temperatures up to about 550° C. by first deoxygenating the same and then contacting the deoxygenated gas with surfaces of metallic iron or the like, whereby corrosion of such surfaces is reduced or substantially avoided altogether. This makes possible the handling of hydrochloric acid gas in iron apparatus, pipes, conduits, etc. without material deterioration thereof at higher temperatures than have been practically feasible heretofore. Still further, the invention affords a novel method of heating and conditioning hydrochloric acid gas, whether or not the same is to be subsequently contacted with an iron surface, by direct contact with a suitable form of carbon at about a red heat, combining the heating in one operation with the purification of the gas from oxygen or other impurities. Such method of heating in a simple and direct manner provides for effective transfer of heat, and avoids difficulties due to the corrosive nature of the acid gas.

In the following claims, the expression "metallic iron", where used, is understood to include steels generally and other alloys in which metallic iron is the predominating constituent.

Other modes of applying the principle of our invention may be employed instead of the one explained, change being made as regards the method herein disclosed, provided the step or steps stated by any of the following claims or the equivalent of such stated step or steps be employed.

We therefore particularly point out and distinctly claim as our invention:—

1. A method of treating a comminuted solid material with hydrochloric acid gas which comprises deoxygenating such acid gas and contacting the same with such material at a temperature between about 140° and 550° C. while in exposure to surfaces of metallic iron.

2. A method of preparing anhydrous magnesium chloride which comprises treating a magnesium compound reactable with hydrochloric acid to form magnesium chloride with substantially oxygen-free hydrochloric acid gas at a temperature between about 325° and 550° C.

3. A method of preparing anhydrous magnesium chloride which comprises deoxygenating a body of hydrochloric acid gas and contacting the same with a magnesium compound reactable with hydrochloric acid to form magnesium chloride at a temperature between 325° and 550° C. in the presence of exposed surfaces of metallic iron.

4. A method of preparing anhydrous magnesium chloride which comprises drying a partially dehydrated form thereof in an atmosphere of substantially oxygen-free hydrochloric acid gas at a temperature between 325° and 550° C.

5. A method of preparing anhydrous magnesium chloride which comprises deoxygenating a body of hydrochloric acid gas and contacting the same with a partially dehydrated magnesium chloride at a temperature between 325° and 550° C. in the presence of exposed surfaces of metallic iron, whereby to convert said chloride to the anhydrous form.

SHELDON B. HEATH.
ORMOND E. BARSTOW.